United States Patent [19]

Shinbori et al.

[11] Patent Number: 4,880,213

[45] Date of Patent: Nov. 14, 1989

[54] GAS SPRING APPARATUS

[75] Inventors: Takeyoshi Shinbori, Yokosuka; Ichiro Takadera, Tokyo; Kohei Taguchi, Yokohama, all of Japan

[73] Assignee: NHK Spring Co., Ltd., Yokohama, Japan

[21] Appl. No.: 212,109

[22] Filed: Jun. 27, 1988

Related U.S. Application Data

[63] Continuation-in-part of Ser. No. 6,622, Jan. 22, 1987, abandoned.

[30] Foreign Application Priority Data

Jan. 30, 1986 [JP] Japan .................................. 61-10974
Jun. 13, 1986 [JP] Japan .................................. 61-137470

[51] Int. Cl.$^4$ ............................................. F16F 9/04
[52] U.S. Cl. .............................. 267/64.27; 267/64.23; 92/48; 92/98 R; 188/298
[58] Field of Search ............... 267/64.19, 64.23, 64.27; 188/298; 428/35; 92/48, 49, 66, 103 R, 103 SD, 103 F, 103 M, 90, 98 R, 34, 47

[56] References Cited

U.S. PATENT DOCUMENTS

| | | |
|---|---|---|
| 3,013,920 | 12/1961 | Harris et al. .................... 267/64.27 |
| 3,140,085 | 7/1964 | Carbon ............................ 267/64.23 |
| 3,397,621 | 8/1968 | Groves .................................... 92/48 |
| 3,469,661 | 9/1969 | Hoffmann et al. . |
| 3,587,789 | 6/1971 | Keuholz et al. . |
| 3,955,807 | 5/1976 | Takahashi et al. .............. 267/64.23 |
| 4,555,126 | 11/1985 | Ishimitsu et al. . |

Primary Examiner—Robert J. Oberleitner
Assistant Examiner—Mark T. Le
Attorney, Agent, or Firm—Frishauf, Holtz, Goodman & Woodward

[57] ABSTRACT

In a gas spring apparatus according to the present invention, a cylinder assembly comprises a cylinder housing and a rod fitted therein for axial reciprocation. An oil chamber and a gas chamber are defined inside the cylinder assembly, and the capacity of the gas chamber changes as the cylinder housing and rod reciprocate relatively to each other. A damping force generating mechanism is provided in the cylinder assembly. A flexible bladder includes a body made of elastomer and a gas-barrier film. The film is formed on the surface of the elastomer body. The bladder divides the oil and gas chambers completely. Thus, when the rod reciprocates in the axial direction, relatively to the cylinder, the bladder inflates and deflates. The gas spring apparatus is used for a suspension system of an automobile.

20 Claims, 6 Drawing Sheets

GAS SPRING APPARATUS

This application is a continuation-in-part of application Ser. No. 006,622, filed Jan. 22, 1986, abandoned.

BACKGROUND OF THE INVENTION

The present invention relates to a gas spring apparatus, and more specifically, to an improvement of a gas spring apparatus having an oil chamber and a gas chamber therein.

Prior art gas spring apparatuses, which are adapted to contain oil and gas, comprise a cylinder housing and a rod fitted therein. A gas chamber and an oil chamber are defined inside the cylinder housing. Compressed gas, such as nitrogen gas, is sealed in the gas chamber. The repulsive force of the gas functions as a gas spring. Damping force generating means is provided inside the cylinder housing. The oil in the oil chamber is subjected to viscous resistance as it passes through the generating means, so that reciprocation of the rod is damped.

In the conventional gas spring apparatuses, a free piston is disposed between the oil and gas chambers, in order to prevent the gas in the gas chamber from leaking into the oil in the oil chamber. In these apparatuses using the free piston, however, a great frictional resistance is produced at a seal portion, as the piston moves. Moreover, the gas is liable to leak out from the gas chamber, through the seal portion of the piston. Thus, it is difficult to completely prevent the gas from leaking into the oil.

As disclosed in U.S. Pat. No. 3,469,661 or 3,587,789, a gas spring apparatus has been proposed which uses a flexible cylindrical bladder. However, the conventional bladder cannot satisfactorily prevent the gas in the gas chamber from penetrating into the oil chamber. Therefore, prolonged use of the apparatus may possibly cause a gas leak, which results in a reduction in capacity of the gas chamber. If the gas chamber capacity is reduced in this manner, the spring constant of the apparatus increases. Thus, if the gas spring apparatus is used for a suspension system of an automobile, the vehicle becomes less comfortable to ride in, and its height is lowered. To avoid this, gas must be resupplied to the gas chamber inside the cylinder housing. The gas resupply, however, requires considerable labor.

SUMMARY OF THE INVENTION

Accordingly, an object of the present invention is to provide a gas spring apparatus, in which gas confined in a gas chamber, inside the apparatus, can be prevented securely from leaking into an oil chamber. Another object of the invention is to provide a gas spring apparatus which, having a highly durable bladder, never produces such a substantial frictional resistance as is caused by the use of a free piston.

In order to achieve the above objects, a gas spring apparatus according to the present invention comprises a cylinder assembly including at least one cylinder housing and a rod, the rod being fitted in the cylinder housing and movable in the axial direction of the cylinder housing, the cylinder assembly further including an oil chamber for containing oil and a gas chamber for containing gas; damping force generating means disposed inside the cylinder assembly, and adapted to damp reciprocation of the rod by utilizing viscous resistance, produced when the oil in the cylinder assembly is circulated; and a flexible bladder in the form of a bag or hollow cylinder, located between the oil chamber and the gas chamber, the bladder including a body made of elastomer, and a gas-barrier film made of a material impermeable to gas, and formed on the inner and/or outer surface of the body, the film dividing the oil chamber from the gas chamber.

In the gas spring apparatus constructed in this manner, if the rod moves in its contracting direction, relatively to the cylinder housing, gas in the cylinder assembly is compressed. As a result, the capacity of the gas chamber is reduced, so that the gas in the gas chamber increases its repulsive force. If the rod moves in its extending direction, on the other hand, the capacity of the gas chamber increases, so that the repulsive force of the gas therein weakens.

Thus, as the cylinder housing and the rod reciprocate relatively in the axial direction, the capacity of the gas chamber varies, so that the bladder inflates and deflates. The gas-barrier film of the bladder can securely prevent the gas in the gas chamber from leaking into the oil in the oil chamber. The film is put on the thick-walled, flexible elastomer body. While the bladder is inflating or deflating, in this arrangement, the film can never bend sharply. Even after repeated deformation, therefore, the gas-barrier film can neither crack nor lower its mechanical strength, thus enjoying high durability. In inflating and deflating, moreover, the bladder never produces such a substantial frictional resistance as is caused by the movement of a free piston.

DETAILED DESCRIPTION OF THE PREFERRED EMBODIMENTS

Figures 1, 2, 3:
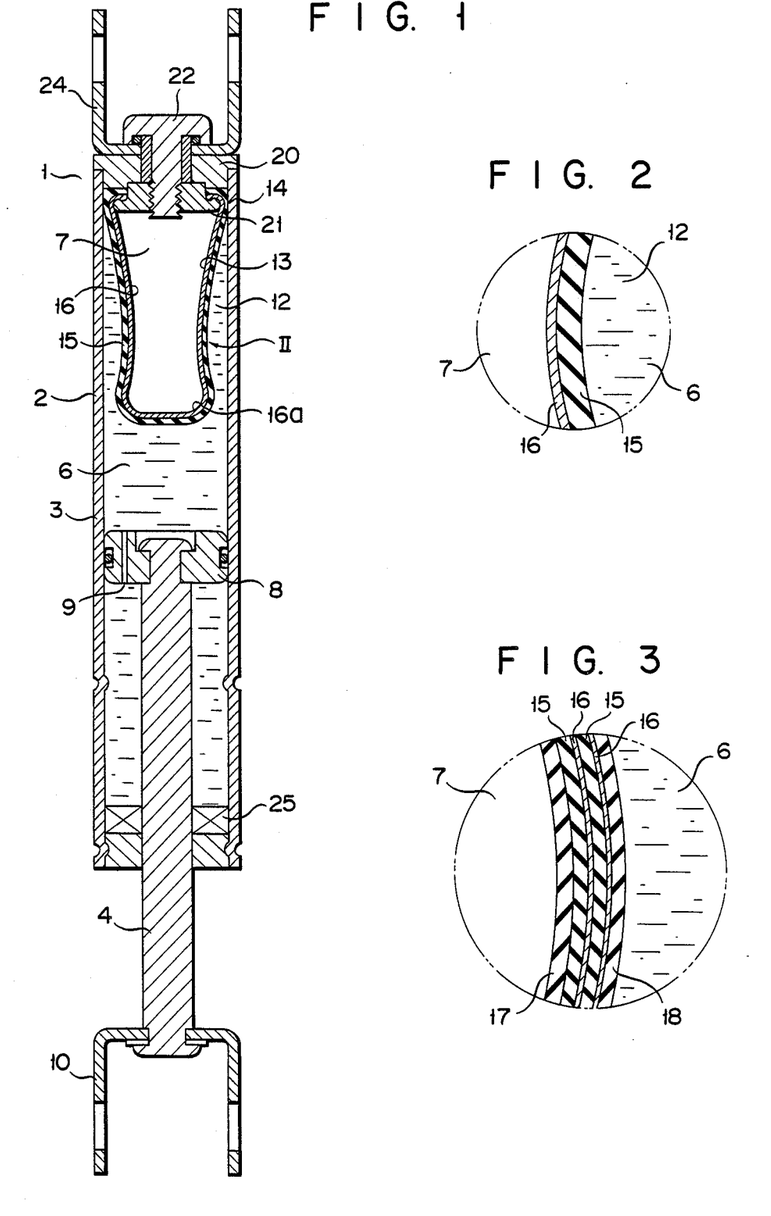
FIG. 1 is a longitudinal sectional view of a gas spring apparatus according to a first embodiment of the present invention.
FIG. 2 is an enlarged view showing portion II of FIG. 1.
FIG. 3 is a sectional view showing a modification of a bladder shown in FIG. 1.

FIG. 1 shows a first embodiment of the present invention. As shown in FIG. 1, gas spring apparatus 1 comprises cylinder assembly 2, which includes cylinder housing 3 and rod 4. Defined inside housing 3 are oil chamber 6 which contains oil, and gas chamber 7 in which gas is sealed. Preferably, the gas is an inert gas, such as nitrogen gas. Rod 3, which is fitted in housing 3, can reciprocate in the axial direction. Piston portion 8 is mounted on one end of rod 4. It is formed with orifice 9. Coupling member 10 is attached to the other end of rod 4.

Flexible bladder 12 is contained in cylinder housing 3. It has sealed internal space 13, and divides oil chamber 6 from gas chamber 7. Bladder 12 is in the form of a bag which is open at one end 14. Space 13 serves as gas chamber 7. Oil chamber 6 is defined outside bladder 12. As shown in the enlarged view of FIG. 2, bladder 12 includes body 15 lined with metallic (i.e., non-elastomeric) gas-barrier film 16. Body 15 is formed of elastomer, which has a low modulus of bending elasticity, and can maintain flexibility even at low temperatures. The elastomer, for use as the material of body 15, may be polyurethane, polyester, or polyamide elastomer, for example. The thickness of body 15 ranges from about 0.1 mm to 5 mm, and that of film 16 from about $3 \times 10^{-5}$ mm to $5 \times 10^{-2}$ mm. Such a thickness of elastomer will inherently have gas-barrier characteristics (i.e., it substantially prevents the gas from flowing therethrough).

In an example where the elastomer body 15 of the present invention was formed of polyurethane, it had a gas barrier characteristic of $5 \times 10^{-11}$ cc·cm/(cm$^2$·sec·cmHg), which was measured by the manometer method according to A$TM (American Society for Testing & Materials) D1434. In contrast, the gas-barrier film 16 of the present invention had a gas barrier characteristic of about $1 \times 10^{-11}$ cc·cm/(cm$^2$·sec·cmHg). Therefore, the elastomer body 15 has a certain extent of gas barrier characteristic, though the gas barrier characteristic of the film 16 is superior to that of the elastomer body 15.

Film 16 is formed by coating the inner surface of body 15, previously formed into a bag-shaped structure, with metal, such as aluminum or copper. For example, plating or vacuum evaporation may be used for the film coating. Alternatively, elastomer body 15 may be put on preformed bag-shaped film 16. Also, bladder 12 may be obtained by coating a plain elastomer sheet with film 16, and then forming the resultant structure into a bag.

Instead of lining the body, gas-barrier film 16 may be formed on the outer surface of body 15. In a modification shown in FIG. 3, bladder 12 includes a plurality of bodies 15 and a plurality of gas-barrier films 16 thereon. Elastomer films 17 and 18 are stuck on the inner and outer surfaces of bladder 12, respectively. This bladder has further improved gas-impermeability and higher durability. In some cases, film 16 may be put on part of body 15, as required.

The open end portion of bladder 12 is fixed to cylinder housing 3 by means of a plurality of fixing members 20 and 21 and screw 22. Coupling member 24 is attached to one end of housing 3, while sealing member 25 is provided at the other end of housing 3.

In gas spring apparatus 1 constructed in this manner, when rod 4 reciprocates in the axial direction, relatively to cylinder housing 3, the gas in gas chamber 7 expands and contracts repeatedly. If the capacity of chamber 7 varies, bladder 12 is caused to inflate and deflate. As the oil in oil chamber 6 flows through orifice 9, it produces viscous resistance, so that the motion of rod 4 is damped.

According to this embodiment, bladder 12 includes gas-impermeable metal film 16 and thick, flexible elastomer body 15. While bladder 12 is inflating or deflating, therefore, the radius of curvature of curved portion 16a of film 16 cannot become too short. Thus, film 16 can neither crack nor lower its mechanical strength. The gas in gas chamber 7 is isolated completely from the oil in oil chamber 6 by the metal film.

Film 16 may be provided on each of the outer and inner surfaces of body 15. Alternatively, body 15 may be provided on each surface of film 16.

Figure 4:
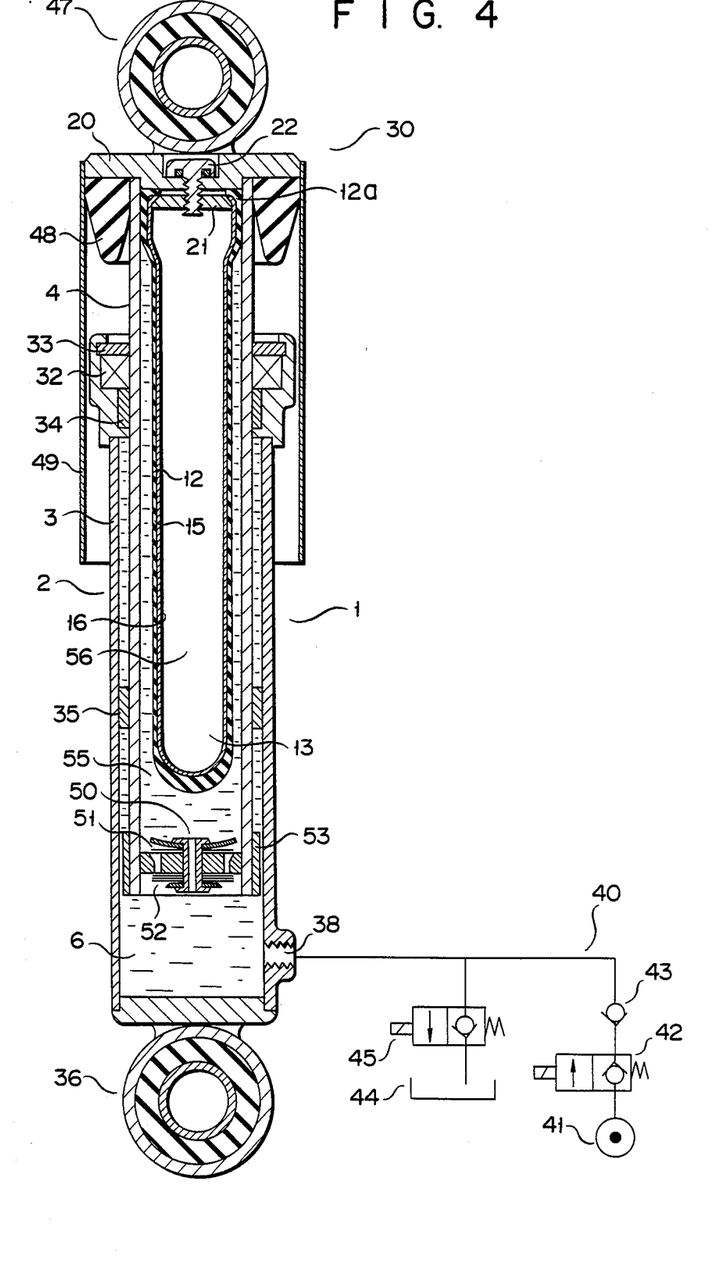
FIG. 4 is a longitudinal sectional view of a gas spring apparatus according to a second embodiment of the invention.

Gas spring apparatus 1 according to a embodiment of the present invention, as shown in FIG. 4, is adapted for use as car suspension system 30. Cylinder assembly 2 of system 30 includes cylinder housing 3 and hollow rod 4. Housing 3 is provided with mechanical seal 32, seal retainer 33, and sliding bearings 34 and 35. Coupling member 36 is attached to the lower end of housing 3. Housing 3 is connected to a member (not shown) on the wheel side, by means of the coupling member 36.

Cylinder housing 3 has oil chamber 6 therein. Oil port 38 in housing 3 is connected to hydraulic unit 40, which includes hydraulic source 41. Arranged between source 41 and port 38 are solenoid-operated valve 42 for lifting and check valve 43. Solenoid-operated valve 45 for lowering is disposed between oil tank 44 and port 38.

Coupling member 47, rubber bumper 48, and dust cover 49 are attached to the upper end portion of hollow rod 4, as shown in FIG. 4. Member 47 is connected to a member (not shown) on the wheel side. Damping force generating mechanism 50 is attached to the inner end of rod 4. It includes conventional plate valves 51 and 52. Rebound stopper 53 is attached to the lower end of rod 4.

Hollow rod 4 has oil chamber 55 and gas chamber 56 therein. Chamber 55 communicates with oil chamber 6 of cylinder housing 3 by means of damping force generating mechanism 50. Rod 4 contains bladder 12 having sealed internal space 13. Like the one used in the first embodiment, bladder 12 includes elastomer body 15 and metallic gas-barrier film 16. It divides oil chamber 55 from gas chamber 56. Compressed nitrogen gas is sealed in chamber 56. End portion 12a of bladder 12 is fixed to rod 4 by means of fixing members 20 and 21 and screw 22.

If rod 4 moves in a direction such that it is pushed into cylinder housing 3, some of the oil in oil chamber 6 flows into oil chamber 55 of rod 4 via damping force generating mechanism 50. As the oil flows through mechanism 50 in this manner, the motion of rod 4 is damped by the viscous resistance of the oil. At the same time, the gas in gas chamber 56 is compressed by the movement of rod 4. Thus, the capacity of chamber 56 is reduced, so that bladder 12 contracts, and the repulsive force of the gas increases.

If rod 4 moves in a direction such that it extends further from cylinder housing 3, on the other hand, some of the oil in oil chamber 55 flows into oil chamber 6 of housing 3. Also in this case, the oil flows past damping force generating mechanism 50, so that the motion of rod 4 is damped. In response to the movement of rod 4 in the extending direction, moreover, gas chamber 56 increases its capacity, so that bladder 12 inflates.

Thus, as rod 4 repeats extension and contraction, relative to cylinder housing 3, suspension system 30 functions both as a shock absorber and a gas spring. If solenoid-operated valve 42 for lifting is opened, the oil delivered from hydraulic source 41 is fed into oil chamber 6. In this case, rod 4 is moved, by oil pressure, in a direction such that it extends further from cylinder housing 3, so that the car height increases. If solenoid-operated valve 45 is opened, with valve 42 closed, the oil in chamber 6 is fed back into tank 44. As a result, the car height is lowered.

Figure 5:
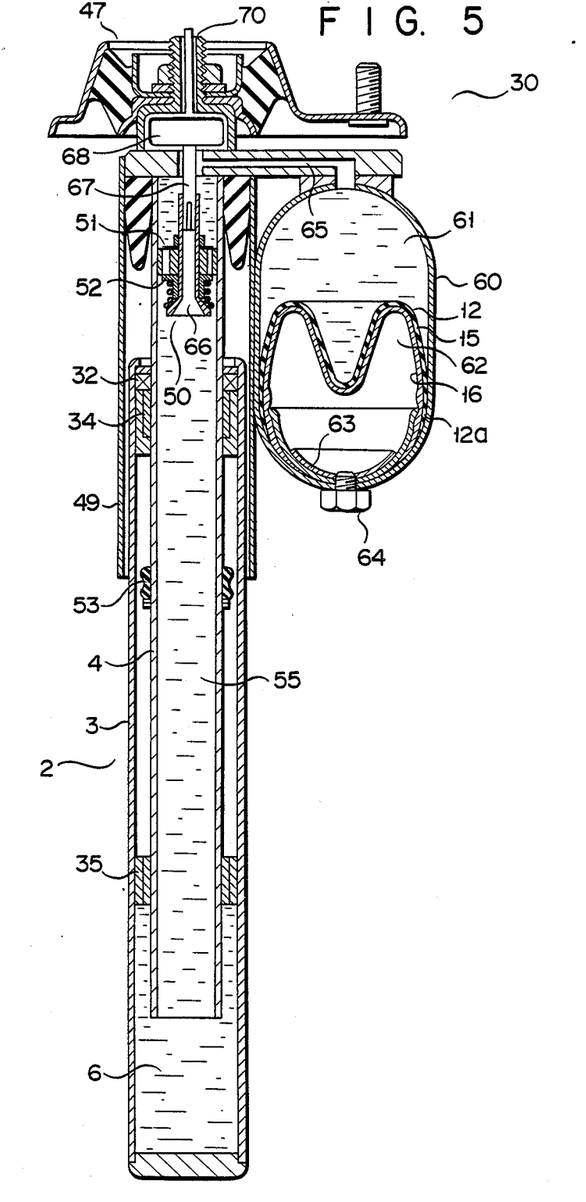
FIG. 5 is a longitudinal sectional view of a gas spring apparatus according to a third embodiment of the invention.

FIG. 5 shows a third embodiment of the present invention. Suspension system 30 of this embodiment is provided with second cylinder housing 60, in addition to first cylinder housing 3. Oil chamber 61 and gas chamber 62 are defined inside housing 60. They are divided by bladder 12. As described in connection with the first and second embodiments, bladder 12 includes elastomer body 15 and metallic gas-barrier film 16. End portion 12a of bladder 12 is fixed to cylinder housing 60 by means of curved plate 63 and screw 64. Oil chamber 61 communicates with oil chamber 55 in hollow rod 4 by means of oil passage 65.

Damping force generating mechanism 50 of the third embodiment includes plate valves 51 and 52 and variable orifice 66. Orifice 66 is provided with rotating needle 67 and motor 68 used to rotate needle 67. When needle 67 is rotated through a predetermined angle by motor 68, the opening area of orifice 66, that is, the intensity of the damping force of suspension system 30 changes. Oil port 70, which communicates with oil chamber 55, is connected to hydraulic unit 40 shown in FIG. 4.

In the third embodiment, when rod 4 moves in the axial direction, relatively to first cylinder housing 3, oil in rod 4 and second cylinder housing 60 flows through oil passage 65 and damping force generating mechanism 50. As rod 4 reciprocates, moreover, the capacity of gas chamber 62 changes, so that bladder 12 inflates and deflates.

Figure 6:
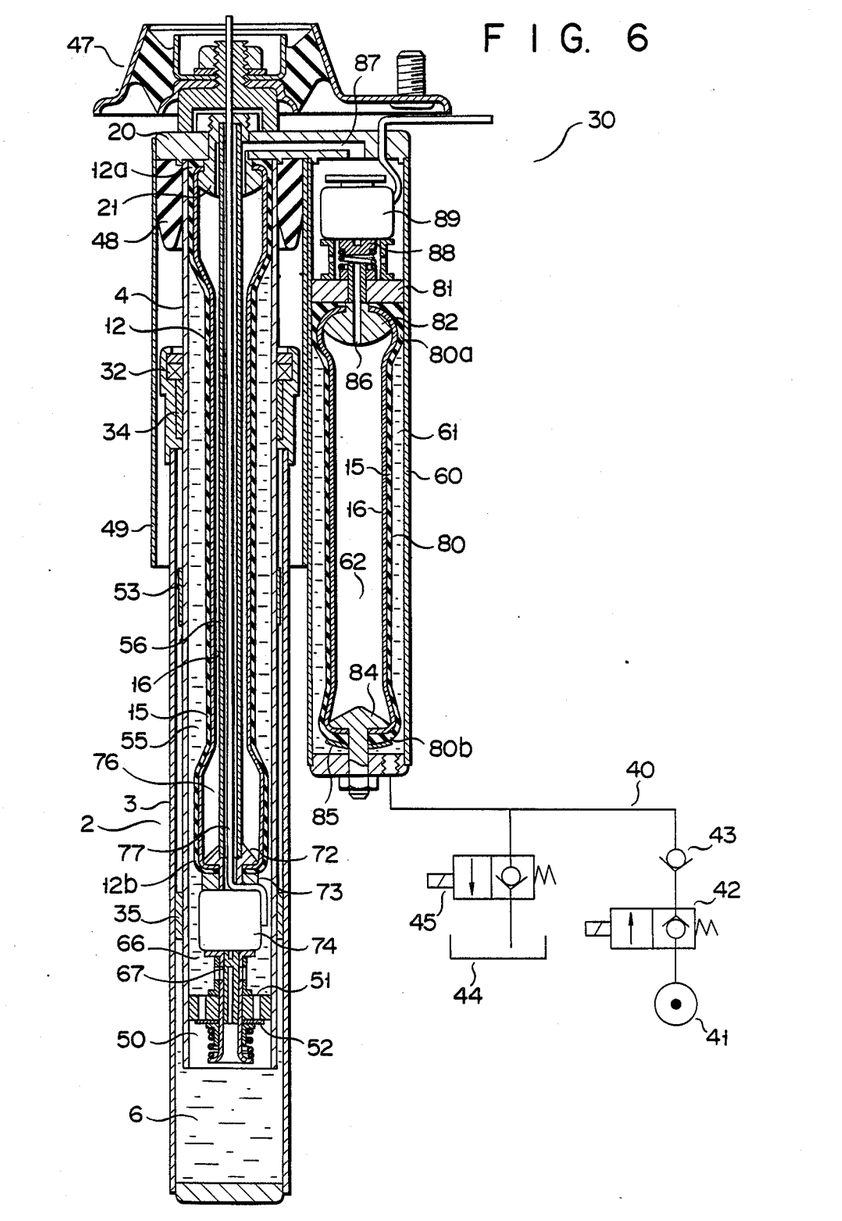
FIG. 6 is a longitudinal sectional view of a gas spring apparatus according to a fourth embodiment of the invention.

FIG. 6 shows a fourth embodiment of the present invention. Suspension system 30 of this embodiment comprises cylindrical first bladder 12 inside first cylinder housing 3. Hollow rod 4 has oil chamber 55 and gas chamber 56 therein. The two chambers are divided by first bladder 12. As in the foregoing embodiments, bladder 12 includes elastomer body 15 and metallic gas-barrier film 16. One end 12a of bladder 12 is fixed to hollow rod 4 by means of a pair of fixing members 20 and 21. The other end 12b of bladder 12 is fixed to a pair of fixing members 72 and 73. Motor 74 is mounted on member 73. Pipe 76 is inserted in bladder 12 along its axis. Lead wire 77 is passed through pipe 76.

Damping force generating mechanism 50 includes plate valves 51 and 52 and variable orifice 66. Orifice 66 is provided with rotating needle 67, which is rotated through a predetermined angle by motor 74. Motor 74 is controlled by electrical signals transmitted through lead wire 77.

Second bladder 80 is provided inside second cylinder housing 60. Bladder 80 also includes elastomer body 15 and metallic gas-barrier film 16. One end 80a of bladder 80 is fixed to housing 60 by means of a pair of fixing members 81 and 82. The other end 80b of bladder 80 is fixed to housing 60 by means of a pair of fixing members 84 and 85.

Second gas chamber 62 is defined inside second bladder 80. Chamber 62 communicates with gas chamber 56 of first bladder 12 by means of gas passages 86 and 87. Second cylinder housing 60 contains gate valve 88 which is used to open and close passage 86. Valve 88 is driven by solenoid 89. Compressed nitrogen gas is sealed in gas chambers 56 and 62.

In the fourth embodiment constructed in this manner, if gate valve 88 is opened, first and second gas chambers 56 and 62 connect with each other. In this case, chambers 56 and 62 cooperate as gas springs, so that the spring constant is lowered. If valve 88 is closed, on the other hand, only first chamber 56 serves as a gas spring, so that the spring constant increases.

Figures 7, 8:
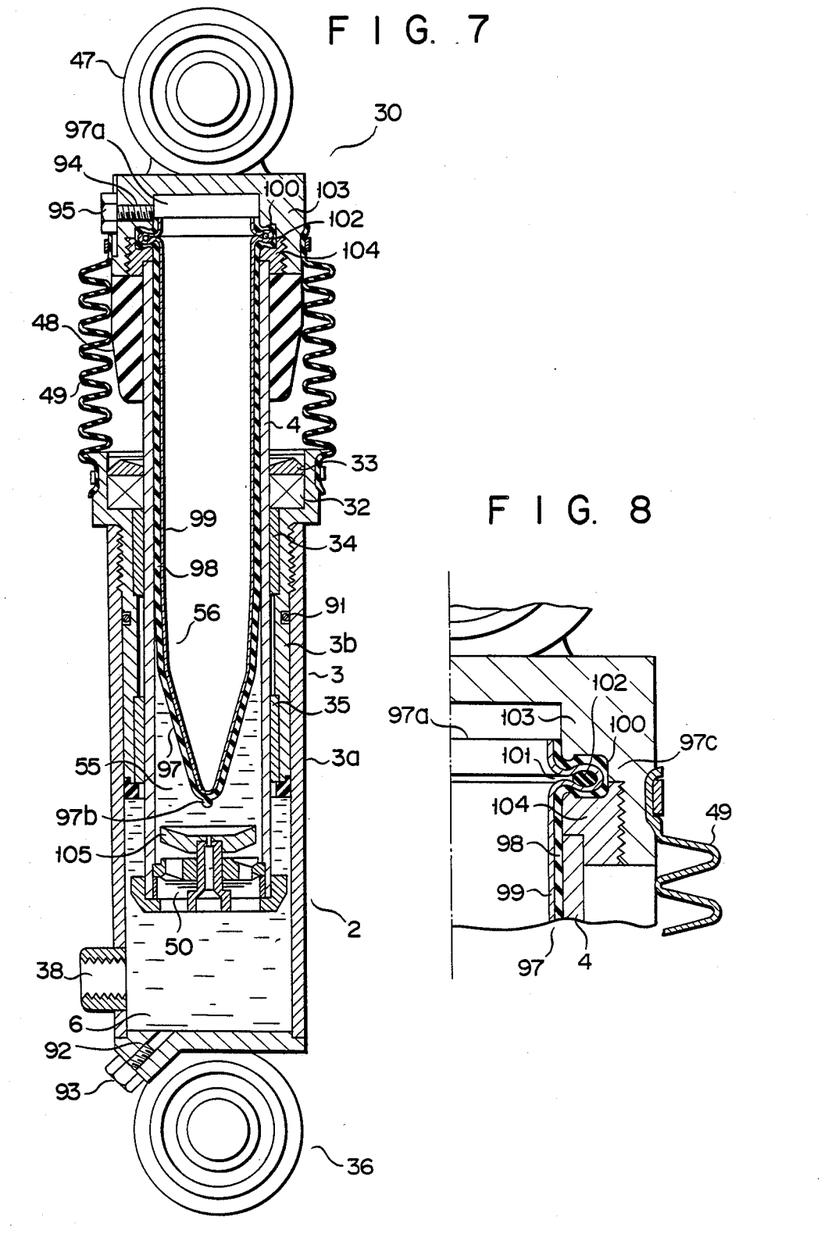
FIG. 7 is a longitudinal sectional view of a gas spring apparatus according to a fifth embodiment of the invention.
FIG. 8 is an enlarged sectional view showing part of the gas spring apparatus of FIG. 7.

FIG. 7 shows a fifth embodiment of the present invention. Cylinder housing 3 of this embodiment includes cylindrical first member 3a and cylindrical second member 3b fitted therein. Sealing member 91 is provided between members 3a and 3b. Vent hole 92 in housing 3 is used to discharge air from oil chamber 6 when injecting oil into chamber 6. Hole 92 is closed by blind plug 93.

Oil chamber 55 and gas chamber 56 are defined inside hollow rod 4. Gas inlet port 94 in rod 4 is closed by means of blind plug 95 after nitrogen gas is fed into chamber 56. Dust cover 49 is bellows-shaped.

Hollow rod 4 contains bladder 97 which serves to divide oil chamber 55 from gas chamber 56. Bladder 97 includes elastomer body 98 and plastic gas-barrier film 99 attached to the inside of body 98. Film 99 is formed of synthetic resin which is substantially impermeable to the gas in gas chamber 56. The synthetic resin, for use as the material of film 99, may be ethylene-vinyl alcohol copolymer, polyvinyl chloride, polyvinylidene chloride, or any high-molecular compound containing acrylonitrile, for example. The thickness of film 99 is 200 $\mu$m or less, preferably 20 to 50 $\mu$m. The elastomer, for use as the material of body 98, may be polyurethane, polyester, or polyamide elastomer, for example. The thickness of body 98 ranges from about 0.1 mm to 5 mm, for example.

In an example, the thickness of an ethylene-vinyl alcohol copolymer film 99 is 20 $\mu$m, and the gas barrier characteristic of film 99 is $4.0 \times 10^{-11}$cc·cm/(cm$^2$·sec·cmHg). On the other hand, the thickness of the polyester elastomer body 98 is 0.5 mm, and the gas barrier characteristic of said elastomer body 98 is $1.9 \times 10^{-10}$cc·cm/(cm$^2$·sec·cmHg).

The critical maximum value of the gas barrier characteristic of the films 16, 99 is about $1 \times 10^{11}$cc·cm/(cm$^2$·sec·cmHg). Films according to the present invention must have a gas barrier characteristic not greater than said maximum value in order to be operable in the present invention.

The critical maximum value of the gas barrier characteristic of the elastomer bodies 15, 98 is about $6 \times 10^{-10}$cc·cm/(cm$^2$·sec·cmHg). For the elastomer body to be considered to have a gas barrier characteristic, according to the present invention, said gas barrier characteristic must be not greater than said maximum value.

Bladder 97 with such a multilayer wall is a bag-shaped structure, formed by blow molding. The blow molding is performed as follows. First, a tubular parison, including body 98 and film 99 joined together, is hung down in an outer mold (not shown). Then, the lower end of the parison is pinched by the mold, and compressed gas is forced into the parison through its top opening. Thus, the parison is inflated until its outer surface comes into contact with the inner surface of the mold.

As shown in the enlarged view of FIG. 8, bladder 97 is formed with projection 100, located close to open end 97a. Projection 100 protrudes outward from the outer surface of bladder 97, and extends in the form of a continuous ring, along the circumference of the bladder. Corresponding in position to projection 100, recess 101 is formed in the inner surface of bladder 97. The recess is also continuous in the circumferential direction. Sealing member 102, such as an O-ring, is fitted in recess 101. Projection 100 is fixed to hollow rod 4 by means of a pair of fixing members 103 and 104. Member 103 is screwed in member 104. Thus pinched from both sides, with respect to the axial direction of bladder 97, projection 100 is fixed to rod 4 in a liquid-tight manner. Member 105 for regulating the position of closed end 97b of bladder 97 is opposed to end 97b.

Bladder 97 includes plastic film 99, having impermeability to gas, and thick, flexible elastomer body 98 stuck on film 99. Even though the bladder inflates or deflates, therefore, film 99 cannot bend with too short a radius of curvature. Thus, the film can neither crack nor lower its mechanical strength, so that the gas in gas chamber 56 is isolated completely from the oil in oil chamber 55 by film 99. Since sealing member 102 fitted in recess 101, along with projection 100, is pinched by fixing members 103 and 104, moreover, end portion 97c is sealed very satisfactorily.

Figures 9, 10, 11:
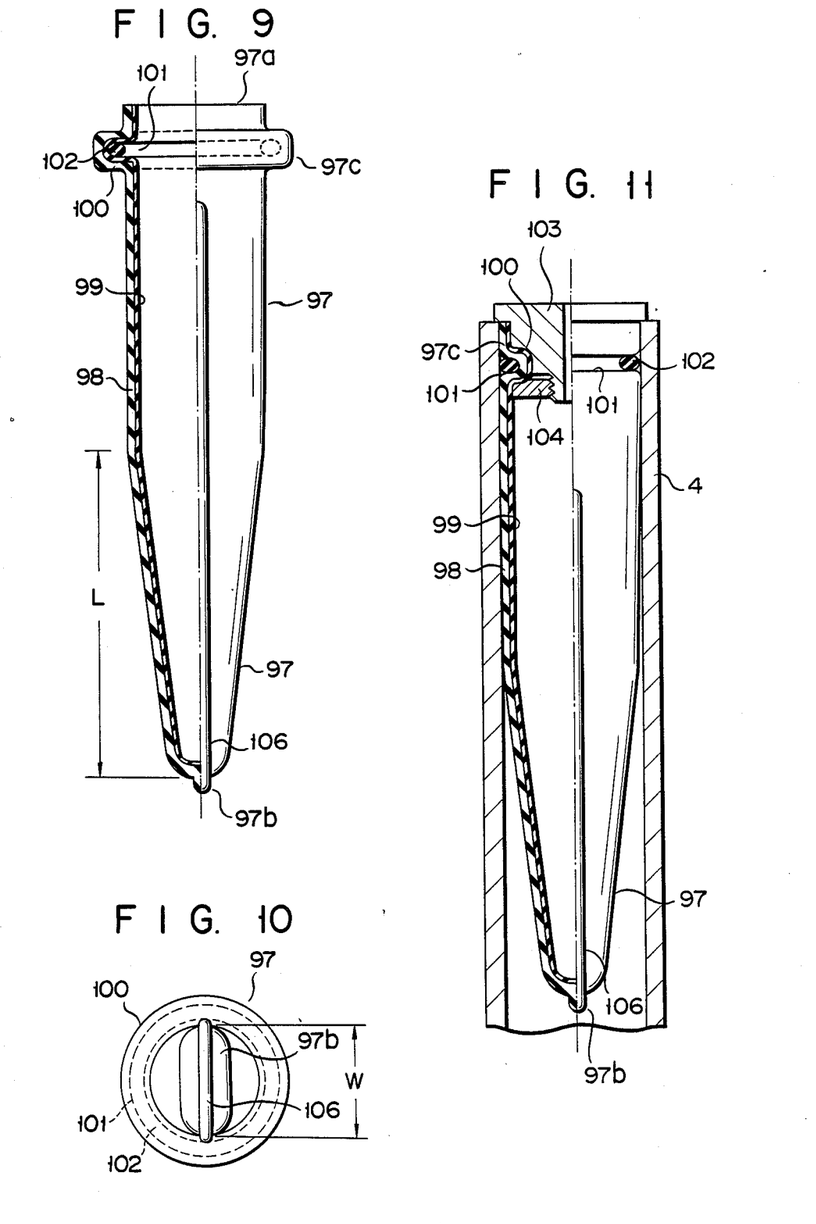
FIG. 9 is a side view, partially in section, showing a modification of a bladder shown in FIG. 7.
FIG. 10 is a bottom view of the bladder shown in FIG. 9.
FIG. 11 is a side view, partially in section, showing another modification of the bladder shown in FIG. 7.

FIGS. 9 and 10 show a modification of bladder 97. In this modification, the bladder is tapered for length L. Width W of bladder 97, as shown in FIG. 10, is uniform substantially over the full length of the bladder. Thus, bladder 97 becomes flatter with distance from its open end. This bladder is also formed by blow molding. Rib 106 is formed on closed end 97b of bladder 97, which is adapted to be pinched off. The rib serves to secure a wide bonding area at closed end 97b to be pinched off, thereby improving the bonding strength of end 97b. Substantially covering the overall length of bladder 97, rib 106 can prevent the oil from being confined between the outer surface of bladder 97 and the inner surface of hollow rod 4 when bladder 97 inflates most.

FIG. 11 shows another modification of bladder 97. In this modification, projection 100 protrudes inward from the inner surface of the bladder. It has the form of a ring which is continuous in the circumferential direction of bladder 97. Corresponding in position to projection 100, recess 101 is formed in the outer surface of bladder 97. The recess is also continuous in the circumferential direction of bladder 97. Sealing member 102 is fitted in recess 101. As projection 100 is pinched by a pair of fixing members 103 and 104, end portion 97c of bladder 97 is fixed to hollow rod 4.

What is claimed is:

1. A gas spring apparatus comprising:
   a cylinder assembly including at least one cylinder housing and a rod, said rod being fitted in said cylinder housing and being movable in the axial direction of said cylinder housing, said cylinder assembly further including an oil chamber for containing oil and a gas chamber for containing gas;
   damping force generating means disposed inside said cylinder assembly, and being adapted to damp reciprocation of said rod by means of viscous resistance produced when the oil in said cylinder assembly is circulated; and
   a flexible bladder in the form of a bag, located between said oil chamber and said gas chamber and extending at least partly into said oil chamber, said gas chamber being defined inside the hollow of said bladder and said oil chamber being defined outside the hollow of said bladder, said bladder dividing said gas chamber from said oil chamber, and said oil in said oil chamber contacting an outer surface portion of said bladder;
   said bladder including a flexible elastomer body made of an oil impervious elastomer having a thickness of from about 0.1 mm to about 5 mm so as provide a gas-barrier characteristic to substantially prevent passage of said gas therethrough, and a gas-barrier film made of a non-elastomeric material impermeable to said gas forming an inner surface of said bladder that is directly exposed to said gas chamber, said non-elastomeric gas-barrier film having a gas-barrier characteristic which is better than that of said elastomeric body, said gas barrier characteristic of said gas-barrier film being not more than about $1 \times 10^{-11}$ cc·cm/(cm$^2$·sec·cmHg), said elastomer body covering the outer surface of said gas-barrier film to protect said gas-barrier film, and said elastomer body being thicker than said gas-barrier film, said oil contacting said outer surface portion of said bladder contacting said elastomeric body to prevent said elastomer body from drying out and to provide lubrication if said elastomer body contacts a wall of said cylinder assembly.

2. The gas spring apparatus according to claim 1, wherein said gas-barrier film is comprised of metal.

3. The gas spring apparatus according to claim 1, wherein said gas-barrier film is comprised of synthetic resin.

4. The gas spring apparatus according to claim 1, wherein said elastomer body is formed of a material selected from the group consisting of polyurethane elastomer, polyester elastomer, and polyamide elastomer.

5. The gas spring apparatus according to claim 4, wherein said rod is hollow, and said bladder is contained in said hollow rod.

6. The gas spring apparatus according to claim 1, wherein said cylinder housing includes a first cylinder housing portion in which said rod is fitted and a second cylinder housing portion coupled to said first cylinder housing portion, said second cylinder housing portion having said oil and gas chambers therein, and containing said bladder.

7. The gas spring apparatus according to claim 1, further comprising a hydraulic unit coupled to said cylinder assembly, and adapted to deliver said oil from or into said oil chamber.

8. The gas spring apparatus according to claim 1, wherein said bladder has an open end, and which further comprises a circumferentially continuous projection, protruding outwardly from that portion of the outer peripheral surface of said bladder in the vicinity of said open end, and a circumferentially continuous recess formed in the inner peripheral surface of said bladder, in a position corresponding to said projection, said recess having an O-ring therein.

9. The gas spring apparatus according to claim 8, wherein said bladder is a molded member.

10. The gas spring apparatus according to claim 8, wherein said cylinder assembly further includes a pair of fixing members for fixing said the bladder, whereby said projection is pinched from both sides thereof, with respect to said axial direction of the bladder.

11. The gas spring apparatus according to claim 1, wherein said bladder has an open end, and which further comprises a circumferentially continuous projection, protruding inwardly from that portion of the inner peripheral surface of said bladder in the vicinity of said open end, and a circumferentially continuous recess formed in the outer peripheral surface of said bladder, in a position corresponding to said projection, said recess having an O-ring therein.

12. The gas spring apparatus according to claim 11, wherein said bladder is a blow molded member.

13. The gas spring apparatus according to claim 11, wherein said cylinder assembly further includes a pair of fixing members for fixing said bladder, whereby said projection is pinched from both sides thereof, with respect to the axial direction of said bladder.

14. The gas spring apparatus according to claim 1, wherein said rod is hollow, and said bladder is contained in said hollow rod.

15. The gas spring apparatus according to claim 1, wherein said gas-barrier film is comprised of ethylene-vinyl alcohol copolymer.

16. The gas spring apparatus according to claim 1, wherein said gas-barrier film is comprised of polyvinyl chloride.

17. The gas spring apparatus according to claim 1, wherein said gas-barrier film is comprised of polyvinylidene chloride.

18. The gas spring apparatus according to claim 1, wherein said gas-barrier film is comprises of high molecular compound containing acrylonitrile.

19. The gas spring apparatus according to claim 1, wherein said elastomer body has a gas barrier characteristic of not more than about $6 \times 10^{-10} cc \cdot cm/(cm^2 \cdot sec \cdot cmHg)$.

20. The gas spring apparatus according to claim 1, wherein said film has a thickness of from about $3 \times 10^{-5}$ mm to about $5 \times 10^{-2}$ mm.

* * * * *

UNITED STATES PATENT AND TRADEMARK OFFICE
CERTIFICATE OF CORRECTION

PATENT NO. : 4,880,213
DATED : November 14, 1989
INVENTOR(S) : SHINBORI et al

It is certified that error appears in the above-identified patent and that said Letters Patent is hereby corrected as shown below:

In the title page, under "Foreign Application Priority Data", change "61-10974" to --61-10974 (U)--.

Signed and Sealed this

Twenty-ninth Day of October, 1991

Attest:

HARRY F. MANBECK, JR.

*Attesting Officer*  *Commissioner of Patents and Trademarks*